US009425716B2

(12) United States Patent
Kestermann

(10) Patent No.: US 9,425,716 B2
(45) Date of Patent: Aug. 23, 2016

(54) METHOD FOR EXAMINING AN ELECTRIC ENERGY ACCUMULATOR

(75) Inventor: Hermann Kestermann, Rheine (DE)

(73) Assignee: SSB Wind Systems GmbH & Co. KG, Salzbergen (DE)

( * ) Notice: Subject to any disclaimer, the term of this patent is extended or adjusted under 35 U.S.C. 154(b) by 317 days.

(21) Appl. No.: 13/320,834

(22) PCT Filed: May 3, 2010

(86) PCT No.: PCT/EP2010/055984
§ 371 (c)(1),
(2), (4) Date: Nov. 16, 2011

(87) PCT Pub. No.: WO2010/133444
PCT Pub. Date: Nov. 25, 2010

(65) Prior Publication Data
US 2012/0063900 A1 Mar. 15, 2012

(30) Foreign Application Priority Data

May 17, 2009 (DE) .................. 10 2009 025 819

(51) Int. Cl.
*G01R 31/12* (2006.01)
*H02P 3/04* (2006.01)
*F03D 7/02* (2006.01)

(52) U.S. Cl.
CPC ............... *H02P 3/04* (2013.01); *F03D 7/0224* (2013.01); *F05B 2260/76* (2013.01); *F05B 2260/79* (2013.01); *F05B 2260/80* (2013.01); *F05B 2260/83* (2013.01); *Y02E 10/723* (2013.01)

(58) Field of Classification Search
CPC .......... F03D 7/0224; F03D 7/00; H02P 3/04; G01R 31/12; G01R 31/36; F05B 2260/76; F05B 2260/79; F05B 2260/83; F05B 2260/80; Y02E 10/723

USPC .............. 324/764.01, 765.01, 426–434, 439, 324/548; 318/490, 479; 340/500, 635
See application file for complete search history.

(56) References Cited

U.S. PATENT DOCUMENTS

| 4,189,648 | A | * | 2/1980 | Harner | 290/44 |
| 5,949,168 | A | * | 9/1999 | Dieckmann et al. | 310/75 R |
| 2007/0024227 | A1 | * | 2/2007 | Kunkel et al. | 318/479 |
| 2008/0277938 | A1 | * | 11/2008 | Oohara | F03D 7/0224 290/44 |
| 2009/0001726 | A1 | * | 1/2009 | Warfen et al. | 290/44 |
| 2009/0058086 | A1 | * | 3/2009 | Arinaga et al. | 290/44 |

(Continued)

FOREIGN PATENT DOCUMENTS

DE 297 22 109 U1 3/1998
DE 10 2006 009127 A1 9/2007

(Continued)

OTHER PUBLICATIONS

International Search Report (in German with English translation) and Written Opinion (in German) for PCT/EP2010/055984, mailed Mar. 2, 2011; ISA/EP.

(Continued)

*Primary Examiner* — Son Le
*Assistant Examiner* — Brent J Andrews
(74) *Attorney, Agent, or Firm* — Harness, Dickey & Pierce, P.L.C.

(57) ABSTRACT

A method for checking an electric energy storage device for a blade angle adjustment drive of a wind turbine. The method includes blocking an electric motor, loading an electric energy storage device from the blocked electric motor by means of a converter; and observing the discharging of the electric energy storage device.

16 Claims, 3 Drawing Sheets

(56) References Cited

U.S. PATENT DOCUMENTS

2009/0115191 A1* 5/2009 Warfen et al. .................. 290/44
2009/0261589 A1* 10/2009 Oohara et al. .................. 290/44

FOREIGN PATENT DOCUMENTS

EP 1 852 605 A2 11/2007
EP 2 058 513 A2 5/2009

OTHER PUBLICATIONS

English Translation of the International Preliminary Report on Patentability (Chapter I of the Patent Cooperation Treaty) for PCT/EP2010/055984, issued Nov. 29, 2011.

* cited by examiner

METHOD FOR EXAMINING AN ELECTRIC ENERGY ACCUMULATOR

CROSS-REFERENCE TO RELATED APPLICATIONS

This application is a 371 U.S. National Stage of International Application No. PCT/EP2010/055984, filed May 3, 2010, and claims priority to German Patent Application No. 10 2009 025 819.1 filed May 17, 2009, the disclosures of which are herein incorporated by reference in their entirety.

The invention relates to a method for checking an electric energy accumulator for a blade angle adjustment drive of a wind turbine, which comprises a converter, at least one electric motor, which is fed by the converter, and the energy accumulator. Furthermore, the invention relates to a blade angle adjustment drive for a wind turbine.

An electric energy accumulator (back-up voltage source) in the form of at least one accumulator (battery) and/or a high-power capacitor is used in a wind turbine to supply the blade angle adjustment system (pitch system) when there is a network voltage failure. The availability of the energy accumulator is of decisive significance for the safety of the wind turbine. It is therefore important to monitor the available capacitance of the energy accumulator as this can become smaller owing to aging or other influences.

The monitoring of the capacitance takes place, for example, by means of additional discharging resistances, which are connected by switching apparatuses (for example a contactor) to the energy accumulator. A partial discharging of the energy accumulator is then carried out and the course of the current removed and the battery/capacitor voltage is measured by means of measuring transducers. A further possibility for monitoring the capacitance is provided by a battery management system, which measures all the currents into the battery and the removal currents, records the environmental conditions and thus mathematically determines the residual capacitance.

DE 10 2005 030 709 A1 discloses an actuator for a rotor blade of a wind turbine with an electric motor and with a frequency converter, which has a rectifier to be fed from a current network, an intermediate circuit connected to the rectifier, and an inverter for feeding the motor, the intermediate circuit in a network-fed normal operation of the frequency converter carrying a predetermined nominal operating voltage. The actuator furthermore has an emergency energy supply device connected to the intermediate circuit, which comprises an energy accumulator providing an electrical support voltage, and a diode connected between the energy accumulator and the intermediate circuit, which, with regard to its conducting direction is arranged in such a way that it feeds a support current from the energy accumulator into the intermediate circuit if the intermediate circuit voltage drops below the support voltage. The energy accumulator has a series connection of accumulator units, wherein by a discharging process by means of a known resistance, inter alia from the accumulator voltage, the internal resistance of each accumulator unit can be determined.

This connection has the drawback that to check the accumulator units, additional components are required, which contribute to a cost increase of the actuator.

Proceeding from this, the invention is based on the object of providing a more economical possibility for checking the energy accumulator.

This object is achieved according to the invention by a method according to claim 1 and by a blade angle adjustment drive according to claim 13. Preferred developments of the invention are given in the sub-claims.

The method according to the invention for checking an electric energy accumulator for a blade angle adjustment drive of a wind turbine, which comprises a converter, at least one electric motor, which is fed by the converter, and the energy accumulator, has the method steps of:
- blocking the electric motor,
- loading the energy accumulator by the blocked electric motor by means of the converter,
- observing the discharging of the energy accumulator loaded by the blocked electric motor.

The method according to the invention uses the electric motor already present in the wind turbine as an electric load to discharge the energy accumulator, so that an additional discharge resistance with associated circuit elements can be dispensed with. Furthermore, a brake already present in the wind turbine and/or on the electric motor is preferably used to block the electric motor, so that no additional components are necessary for this either. The blocking of the electric motor preferably takes place mechanically or electromechanically.

To implement the method according to the invention, a control unit is preferably used, which, in particular, comprises a digital computer. As a control unit of this type is preferably already present in the wind turbine and/or the converter, the method according to the invention can be realised with a change or addition to the programme (software) running in the control unit. Thus, the method according to the invention provides a significant cost advantage compared to a conventional solution with a separate discharge resistance. The control unit may be provided externally from the converter. The control unit, however, preferably forms a part of the converter and/or is integrated therein.

As an alternative to the invention it would be conceivable to let the electric motor run unbraked or braked during the discharge. In this case, however, when running the electric motor, the wind and/or the mechanical coupling of the electric motor to the rotor blade could influence the load formed by the electric motor during the discharging of the energy accumulator, which could lead to the determination of a faulty state of the energy accumulator. Therefore, in the method according to the invention, the electric motor is blocked during the loading of the energy accumulator, so that the load formed by the electric motor is constant or substantially constant. Therefore, a decisive description of the state of the energy accumulator can be obtained by observing the discharging.

Owing to the loading of the energy accumulator by the blocked electric motor, a partial discharging of the energy accumulator is preferably carried out. Alternatively, the energy accumulator can also be completely discharged by the loading.

The energy accumulator is preferably electrically connected to an intermediate circuit of the converter during the loading. For example, the energy accumulator is electrically connected to the intermediate circuit before or at the beginning of its loading by the blocked electric motor. This is sensible, in particular, when the energy accumulator is not connected to the intermediate circuit during normal operation of the blade angle adjustment drive. Alternatively, the energy accumulator is permanently electrically connected to the intermediate circuit, i.e. even during normal operation of the blade angle adjustment drive. In this case, the energy accumulator is, or will be, electrically connected to the intermediate circuit preferably with the interposition of at least one diode, so that reactions of the intermediate circuit on the energy accumulator can be prevented. The intermediate circuit is, in particular, a direct voltage intermediate circuit.

A charging apparatus, for example, which is, or can be, electrically connected to the energy accumulator, is provided to charge the energy accumulator. Alternatively, the energy accumulator can be charged by the intermediate circuit. In this case, the diode is preferably bridged to charge the energy accumulator.

The converter, in particular during normal operation, is supplied with electric energy by a primary energy supply. The primary energy supply is preferably an electric network, in particular an internal wind turbine network or an external network, such as, for example, the general power supply network. This network may be a direct current network or an alternating current network, in particular a three-phase system.

The converter and/or the intermediate circuit is preferably separated from the primary energy supply before or at the beginning of the loading of the energy accumulator by the blocked electric motor. In particular, the converter and/or the intermediate circuit is, or will be, electrically separated from the primary energy supply during the loading of the energy accumulator. As a result, an influencing of the discharging of the energy accumulator by the primary energy supply can be avoided. In particular, the intermediate circuit voltage of the converter corresponds to, or approximately to, the voltage of the energy accumulator.

During the loading of the energy accumulator by the blocked electric motor, an electric motor current flows through the electric motor. The observation of the discharging of the energy accumulator preferably comprises the measuring of the electric motor current. In particular, the electric motor current is controlled or regulated during the loading of the energy accumulator by the converter. The electric motor current is preferably kept constant during the loading of the energy accumulator by the converter, the constant current preferably being smaller than or equal to the nominal current of the electric motor. Alternatively, the motor current is kept merely smaller or equal to a threshold value during the loading of the energy accumulator by the converter, said threshold value preferably corresponding to the nominal value of the electric motor. A current measuring device, by means of which the motor current can be measured, is provided to measure the motor current. This measuring device is preferably already present in the blade angle adjustment drive, so that no additional components are necessary to measure the motor current. The measuring of the motor current is carried out, in particular, continuously, virtually continuously or at least repeatedly during the discharging of the energy accumulator, so that a time course of the motor current is detected. According to an alternative, the observation of the discharging of the energy accumulator may, however, also comprise the measuring of the current flowing out of the and/or into the energy accumulator.

The observation of the discharging of the energy accumulator, preferably additionally to the current measurement, comprises the measuring of the intermediate circuit voltage. To measure the intermediate circuit voltage, a voltage measuring device is provided, by means of which the intermediate circuit voltage can be measured. This measuring device is preferably already present in the blade angle adjustment drive, so that to measure the intermediate circuit voltage, no additional components are necessary. The measuring of the intermediate circuit voltage is carried out in particular continuously, virtually continuously or at least repeatedly during the discharging of the energy accumulator, so that a time course of the intermediate circuit voltage is detected. According to an alternative, the observation of the discharging of the energy accumulator may, however, also comprise the measuring of the motor voltage.

On the basis of the observation of the discharging of the energy accumulator, at least one state of the energy accumulator is preferably determined. In particular, on the basis of the observation of the discharging of the energy accumulator, the charging quantity that can be stored in the energy accumulator and/or the charging state of the energy accumulator is determined. The storable charging quantity is, in particular, the maximum charging quantity that can be stored in the energy accumulator.

The energy accumulator preferably is, or forms, a direct current source. According to a configuration of the invention, the energy accumulator comprises at least one battery or is formed thereby. The maximum charging quantity that can be stored in the battery is also called the capacitance of the battery. In addition or alternatively, the energy accumulator preferably comprises at least one capacitor or is formed thereby. In this case, the electric capacitance of the capacitor is preferably determined on the basis of the observation of the discharging of the energy accumulator. This capacitance, which is generally given in Farad (F), is to be distinguished from the capacitance/capacity of the battery, which is generally given in ampere hours (Ah). The energy accumulator therefore preferably comprises at least one battery and/or at least one capacitor.

According to a development of the invention, the battery is composed of one or more battery units, which, are in particular connected in series. In addition or alternatively, the capacitor preferably comprises one or more capacitor units, which are, in particular, connected in series. The series connection of the units is preferably used to increase the voltage of the energy accumulator. However, as an alternative, a parallel connection or a combination of a series connection and parallel connection of the units is also possible, so that the maximum current that can be delivered by the energy accumulator can be increased. If the energy accumulator comprises at least one battery, the state of health (SOH) and/or the state of charge (SOC) of the battery is preferably determined on the basis of the observation of the discharging of the energy accumulator.

The observation of the discharging of the energy accumulator preferably takes place by means of the control unit. The determination of the state(s) of the energy accumulator, in particular the determination of the storable charging quantity, the capacitance and/or the charging state preferably takes place by means of an evaluation unit. The evaluation unit can be provided externally from the converter. The evaluation unit, however, preferably forms a part of the converter and/or is integrated therein.

According to a configuration of the invention, the evaluation unit is completely or partially formed by the control unit and/or integrated therein. According to an alternative configuration of the invention, the evaluation is provided in addition to the control unit. In this case, the evaluation unit is preferably coupled to the control unit, so that, for example, a signal and/or a data exchange can take place between the control unit and the evaluation unit.

The evaluation unit is preferably electrically coupled to a controller, which, for example, forms the controller of the wind turbine. In particular, the evaluation unit delivers the results of the evaluation, such as, for example, the storable charging quantity, the capacitance and/or the charging state, to the controller. If the evaluation unit is provided additionally to the control unit, the evaluation unit can also be formed by the controller. The control unit and/or the converter, for example, can be activated by means of the controller.

The energy accumulator is used, in particular, for the electric emergency power supply of the electric motor, so the latter can temporarily be further operated during a failure of the primary energy supply and/or can carry out an emergency exit. An emergency exit is taken to mean that a rotor blade of the wind turbine coupled to the electric motor is placed or rotated into a safe position, in which the wind preferably exerts no or only a small force on the rotor blade and/or on the rotor of the wind turbine comprising the latter. The safe position is, in particular, the so-called vane position of the rotor blade. In the case of a failure of the primary energy supply, the electric motor is preferably supplied with electric energy by the energy accumulator, in particular by means of the converter.

The method according to the invention is used for checking the energy accumulator, so the loading of the energy accumulator by the blocked electric motor preferably only takes place temporarily. In particular, the blocking of the electric motor is removed after the loading of the energy accumulator by the blocked electric motor. The period for which the blocked electric motor is blocked and the loading of the energy accumulator is observed, can depend on the capacitance of the energy accumulator. According to one configuration of the invention, the period is several seconds, for example 10 seconds. According to another configuration of the invention, the period is one or several minutes, for example 10 minutes. However, shorter or longer periods are also possible. In particular, the number details with regard to the duration are only to be understood by way of example and not in a restrictive manner. The checking of the energy accumulator is preferably carried out when the wind is still or with a slight wind. Furthermore, the energy accumulator can be checked when the wind turbine has been shut down for maintenance and/or testing purposes.

The invention furthermore relates to a blade angle adjustment drive for a wind turbine, comprising a converter, which has a direct voltage intermediate circuit and is, or can be, electrically fed by a primary energy supply, at least one electric motor, which is electrically coupled to the converter and is, or can be, supplied with electric energy by the converter, and an energy accumulator, by which the electric motor is, or can be, electrically fed when the primary energy supply fails. The blade angle adjustment drive is, in particular, developed in such a way that the electric motor is, or can be, blocked by means of a brake, the converter and/or the intermediate circuit is, or can be, electrically separated from the primary energy supply, when the primary energy supply is separated, the energy accumulator is, or can be, electrically loaded by means of the converter by the electric motor blocked by the brake, and the discharging of the energy accumulator loaded by the blocked electric motor is, or can be, observed. The energy accumulator is, or can be, in particular electrically switched to the intermediate circuit.

The method according to the invention is, in particular, carried out with the blade angle adjustment drive according to the invention. The blade angle adjustment drive can therefore be developed according to all the configurations described in conjunction with the method. Furthermore, the method according to the invention can be developed in accordance with all the configurations described in conjunction with the blade angle adjustment drive.

The blade angle adjustment drive preferably has a control unit, by means of which the brake is, or can be, actuated, the primary energy supply is, or can be, electrically decoupled from the intermediate circuit and/or the discharging of the energy accumulator loaded by the blocked electric motor is, or can be, observed.

The control unit preferably comprises a current measuring device, by means of which the motor current is, or can be, measured. The measuring of the motor current by the control unit can be carried out, in particular, continuously, virtually continuously or at least repeatedly, so that a time course of the motor current can be detected. Furthermore, the control unit preferably comprises a voltage measuring device, by means of which the intermediate circuit voltage is, or can be, measured. The measuring of the intermediate circuit voltage can be carried out by means of the control unit, in particular continuously, virtually continuously or at least repeatedly, so that a time course of the intermediate circuit voltage can be detected.

To detect the time course of the motor current and/or the intermediate circuit voltage, the control unit preferably comprises a timer or clock generator, such as, for example, a clock. The control unit, in particular, has a digital computer.

The converter preferably comprises a rectifier and an output stage, the input of which is electrically coupled to the output of the rectifier, preferably with the interposition of the intermediate circuit. The output stage is electrically coupled by its output, preferably to the electric motor and, in particular, can be activated by means of the control unit to control the motor current. The rectifier is preferably coupled, or can be coupled, by its input to the primary energy supply.

According to one configuration of the invention, provided between the primary energy supply and the converter or the intermediate circuit is at least one switch, by means of which the converter and/or the intermediate circuit can be electrically decoupled from the primary energy supply. The switch can be actuated, in particular by means of the control unit. In addition or alternatively, the rectifier is configured as an activatable rectifier, which, for example, can be realised in that the rectifier has switchable, power-converting components, such as, for example, thyristors. In this case, the switch for decoupling the primary energy supply can be dispensed with, as an electric decoupling of the intermediate circuit from the primary energy supply can be achieved by the switchable power-converting components. The activatable rectifier can be controlled, in particular activated and deactivated, in particular by means of the control unit.

The electric motor can be configured as a direct current motor or an alternating current motor. The output stage is preferably configured as an inverter, if the electric motor is an alternating current motor. If the electric motor is, on the other hand, a direct current motor, the output stage is preferably configured as a controllable direct current source, such as, for example, as a pulse-width modulator or as a direct current chopper controller. The output stage is preferably a transistor output stage, which is, in particular, constructed with IGBTs. An output stage of this type can be used both for a direct current motor and also for an alternating current motor.

The brake is preferably a mechanical brake, which brakes, or can brake, the rotor of the electric motor, in particular. The brake has, for example, a friction element and a spring, which presses the friction element against the rotor or against a component non-rotatably connected to the rotor, such as, for example, the motor shaft or a brake disc. An electric magnet is preferably provided, by means of which the friction element can be magnetically moved away from the rotor or the component against the force of the spring.

The friction element preferably at least partially consists of magnetic material. When the primary energy supply fails, the magnetic field of the electric magnet collapses, so the friction element is automatically pressed by the spring against the rotor or the component. The brake is, in particular designed in such a way that it can block the electric motor, even if the latter is loaded with a current, such as, for example with the nominal current or with a larger current.

The electric motor is preferably connected to a rotor blade or wind turbine, in particular mechanically connected, for example with the interposition of a gearing. The rotor blade can preferably be rotated about a blade axis by the electric motor.

According to one configuration of the invention, during operation of the blade angle adjustment drive, using an intermediate circuit converter in phases, in which the blade angle adjustment drive is not active, a capacitance test of the energy accumulator (battery/capacitor) can therefore be carried out by software integrated in the converter. For this purpose, the energy accumulator, which, in the normal operating state, is connected to the intermediate circuit of the converter, is connected by means of the transistor output of the converter to the electric motor, which then serves as the load. The voltage supply of the converter from the network (primary energy supply) is switched off for this test, so that the level of the intermediate circuit voltage corresponds to the level of the voltage of the energy accumulator. The current into the electric motor being used as a load can be detected, as a further variable, by means of the integrated current detection of the converter. Times can be controlled by means of the integrated real time clock of the converter. The converter impresses a current into the motor, it being possible to determine or calculate more precise information about the capacitance from the discharging curve of the energy accumulator. The motor is blocked in this state by means of the installed brake, so that no influencing of the measuring result occurs owing to a rotating motor. If the current from the energy accumulator is limited to values below the nominal current of the electric motor, a thermal overload of the motor can generally not occur. Nevertheless, the motor temperature is monitored so that the test (check) is not, or cannot be, carried out if the motor temperature is above a threshold value owing to a prior loading of the motor.

The delivery or communication of the measuring results can take place by means of the serial interfaces of the control unit already present for data exchange, or else, for example if a minimum capacitance is fallen below, as a digital or analogue signal via other interfaces of the control unit.

Owing to the invention, a reliable statement about the currently present capacitance of the energy accumulator can be made without or with only slight additional outlay or costs with apparatuses already present in the wind turbine. This statement is particularly helpful when planning the regular maintenance, in which the determination of the energy accumulators with too low a capacitance can take place without any separately required input. Furthermore, the reliability of the safety system of the wind turbine can be increased.

The invention will be described below with the aid of a preferred embodiment with reference to the drawings, in which.

Figure 1:
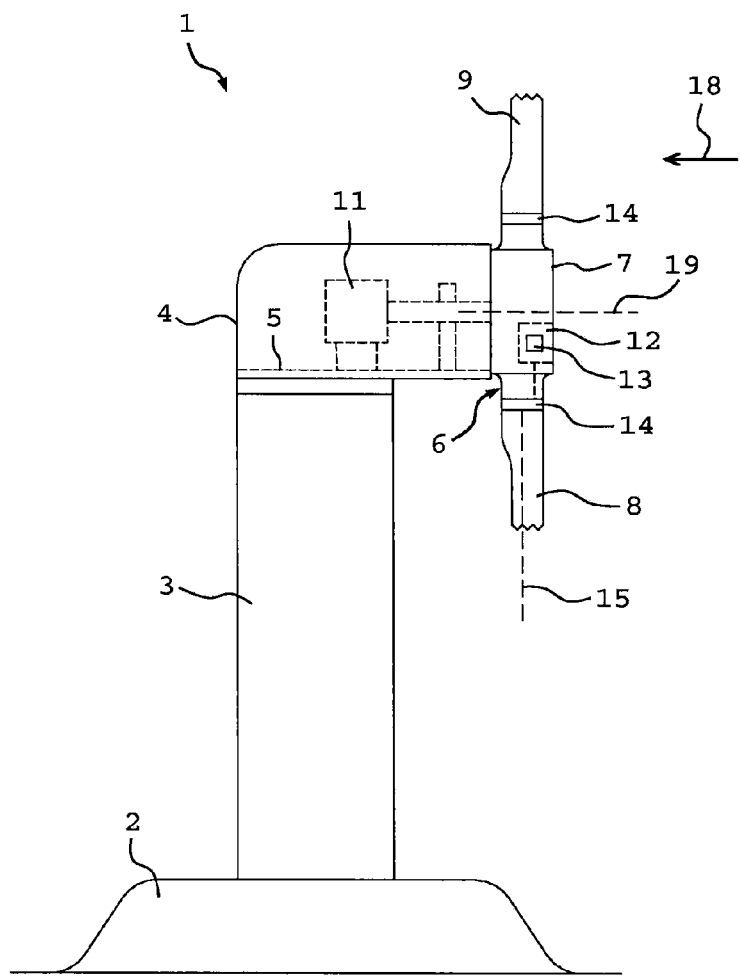
FIG. 1 shows a schematic view of a wind turbine.

A schematic view of a wind turbine 1 can be seen from FIG. 1 and comprises a tower 3, which is standing on a base 2 and on the end of which remote from the base 2 there is arranged a machine housing 4. The machine housing 4 has a holder (carrier) 5, on which a rotor 6 is rotatably mounted, which comprises a rotor hub 7 and a plurality of rotor blades 8, 9 and 10 connected thereto (see also FIG. 2). The rotor 6 is mechanically coupled to an electric generator 11, which is arranged in the machine housing 4 and fastened to the carrier 5.

Figure 2:
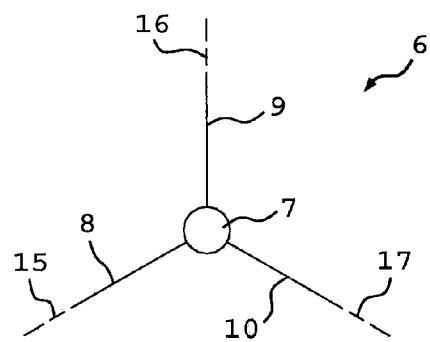
FIG. 2 shows a schematic plan view of the rotor of the wind turbine.

Arranged in the rotor 6 is a blade angle adjustment system 12, which has blade angle adjustment drives 14 comprising emergency power supply devices 13 according to an embodiment of the invention, by means of which the rotor blades 8, 9 and can be rotated about their respective longitudinal axis (rotor blade axis) 15, 16 or 17 relative to the rotor hub 7 (see also FIG. 2). One of the blade angle adjustment drives 14 is preferably associated with each of the rotor blades. The rotor 6 can be rotated by wind force 18 about a rotor axis 19.

FIG. 2 shows a schematic plan view of the rotor 6, so that the three rotor blades 8, 9 and 10 can be seen. Alternatively, only two or more than three rotor blades can also be provided.

Figure 3:
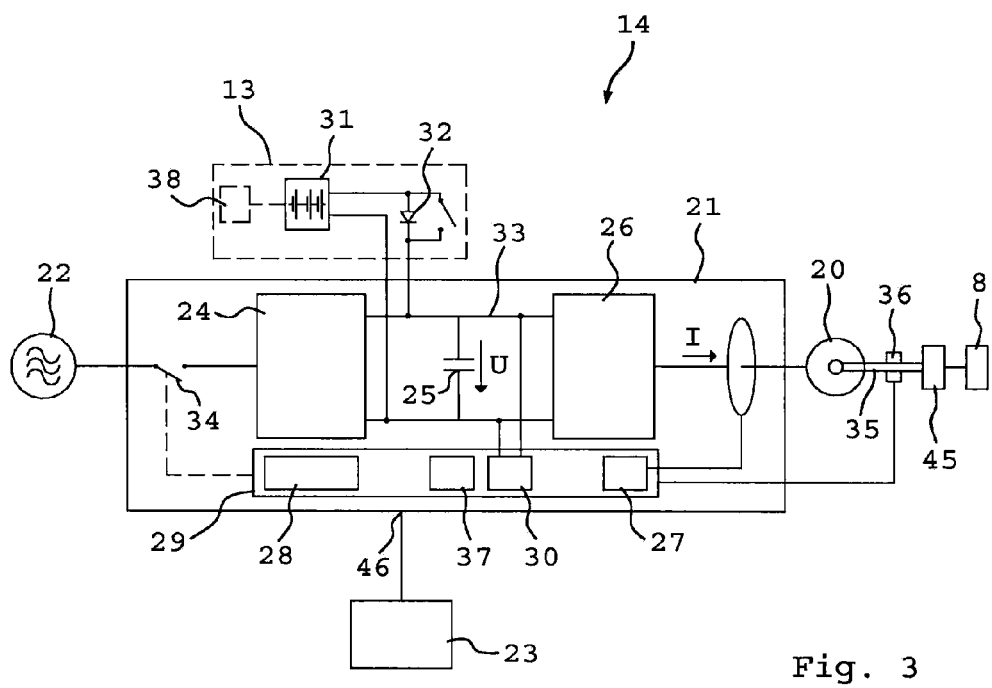
FIG. 3 shows a schematic block diagram of a blade angle adjustment drive.

FIG. 3 shows a schematic block diagram of one of the blade angle adjustment drives 14 with an associated emergency power supply device 13, an electric motor 20 being electrically coupled to a converter 21, which is connected to an electric supply network 22 and fed therefrom. Furthermore, the converter 21 is connected to a controller 23, by means of which the converter 21 is controlled. The converter 21 comprises a rectifier 24, an intermediate circuit 33 with a capacitor 25 and an output stage 26. The motor 20 is mechanically coupled, with the interposition of a gearing 45, to the rotor blade 8, which can be rotated by means of the motor 20 about the rotor blade axis 15.

The motor current I supplied to the motor 20 from the output stage 26 of the converter 21 is measured by means of a current measuring device 27, which is part of a control unit 29 of the converter 21 comprising a digital computer 28. Furthermore, the control unit 29 comprises a voltage measuring device 30, by means of which the intermediate circuit voltage U is measured.

The emergency power supply device 13 comprises an energy accumulator 31 which is connected by a diode 32 to the intermediate circuit 33. The primary energy supply 22 is connected to the input of the rectifier 25 with the interposition of a switch 34, which can be actuated by means of the control unit 29. A brake 36, by means of which a rotation of the motor shaft 35 can be freed, braked and prevented, the latter corresponding to a blocking of the motor 20, is provided on the motor shaft 35 of the motor 20.

During normal operation of the blade angle adjustment drive 14, the switch 34 is closed and the brake 36 in particular released, so that the converter 21 is supplied by the primary energy supply 22 with electric energy and activates the motor 20 to rotate the rotor blade 8 about the blade axis 15. To check the energy accumulator 31, the switch 34 is opened by means of the control unit 29 and the motor 20 is blocked by the brake 36, so that a rotation of the motor shaft 35 is no longer possible. Furthermore, the intermediate circuit voltage U now corresponds to the voltage of the energy accumulator 31 less the voltage dropping at the diode 32, which is generally negligible. The control unit 29 now controls the output stage 26 in such a way that a constant current I is supplied to the motor 20, which is in particular less than or equal to the nominal current of the motor 20. The energy accumulator 31 is therefore discharged, the blocked motor 20 being used as a constant electric load. The current I can be regulated and/or kept constant as the control unit 29 continuously receives information about the actual current I flowing by means of the measuring unit 27 and can correspondingly activate the output stage 26. The control unit 29 therefore has available an electric signal characterising the effective current I.

The intermediate circuit voltage U is continuously detected by means of the measuring unit 30, so the control unit 29 has available an electric signal characterising the effective intermediate circuit voltage U. Furthermore, during the measurement of the intermediate circuit voltage U, the time is detected by means of a clock 37 integrated into the control unit 29 and is available to the control unit 29 in the form of an electric signal. The time is also preferably detected during the measurement of the current I by means of the clock 37. In addition or alternatively, the motor current I is stored in the control unit 29 as a fixed value, which is possible as the current I is kept constant. The control unit 29 therefore has data, which characterise the time course of the intermediate circuit voltage U and/or the current I or its time course during the discharging of the energy accumulator 31 by means of the blocked motor 20.

The control unit 29, on the basis of the time course of the intermediate circuit voltage U and the current I or the time course of the current I, determines the charging state of the energy accumulator and the maximum charging quantity that can be stored in the energy accumulator. Additional information is preferably taken into account for this determination, which is predetermined by the type of energy accumulator 31. If the energy accumulator 31 is a capacitor, the electrical capacitance of the capacitor can also be determined by the control unit 29. The control unit 29 therefore forms an evaluation device for evaluating the voltage and/or current values measured to check the energy accumulator 31. This evaluation supplies a reliable description of the state of the energy accumulator 31. The result of the evaluation, such as, for example, the charging state of the energy accumulator, the maximum charging quantity that can be stored in the energy accumulator and/or the capacitance of the capacitor, is then supplied to the controller 23 via an interface 46, in particular in the form of electric signals.

According to a modification of the configuration, data, which characterise the time course of the intermediate circuit voltage U and/or the current I or its time course during the discharging of the energy accumulator 31 by means of the blocked motor 20, are supplied to the controller 23 via the interface 46. The controller 23 can now determine, on the base of the time course of the intermediate circuit voltage U and the current I or the time course of the current I, the charging state of the energy accumulator and the maximum charging quantity that can be stored in the energy accumulator. Additional information is preferably taken into account for this determination, which is predetermined by the type of energy accumulator 31. If the energy accumulator 31 is a capacitor, the electrical capacitance of the capacitor can also be determined by the controller 23. According to the modification, the controller 23 forms the evaluation device for evaluating the voltage and/or current values measured to check the energy accumulator 31.

The checking of the energy accumulator 31 can be ended in different ways. On the one hand, it is possible to carry out the discharging for a predetermined time period. The check then ends when this time period is over. On the other hand, it is possible to end the check when the intermediate circuit voltage U is less than or equal to a predetermined threshold value. Furthermore, the check can be ended when the motor current I cannot be kept at the desired value and is, for example, less than or equal to a predetermined threshold value. A combination of these criteria for ending the check is also possible. Once the check has ended, the switch 34 is closed, so that the converter 21 is again supplied by the primary energy supply 22 with electric energy. Furthermore, the motor current I can be adjusted to a desired value by corresponding activation of the output stage 26. The brake 36 can also be released, so that the blade angle adjustment drive 14 can adopt its normal operation again and adjust the rotor blade 8.

The energy accumulator 31, which is partially discharged after the check, is now charged either by means of a schematically shown charging device 38 or by a means of the intermediate circuit 33, the diode 32 being bridged in the latter case.

Figure 4:
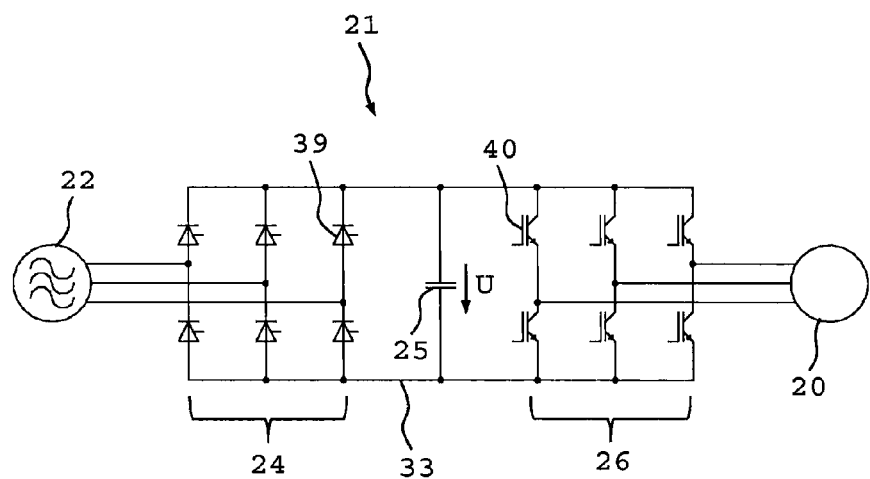
FIG. 4 shows a schematic circuit diagram of the converter.

A schematic circuit diagram of the converter 21 can be seen from FIG. 4, the rectifier 24 comprising six thyristors 39 and therefore being configured as an activatable rectifier. The gate connections of the thyristors 39 are activated by means of the control unit 29, so that, by means of the latter, an activation and deactivation of the rectifier 24 is possible. If the thyristors 39 are not ignited, the intermediate circuit is electrically decoupled from the primary energy supply 22. In this case, the switch 34 can be dispensed with.

The output stage 26 is configured as a transistor output stage and has six IGBTs 40, the gate connections of which are activated by means of the control unit 29. The motor current supplied to the motor 20 can therefore be controlled by means of the output stage 26 and the control unit 29.

Figure 5:
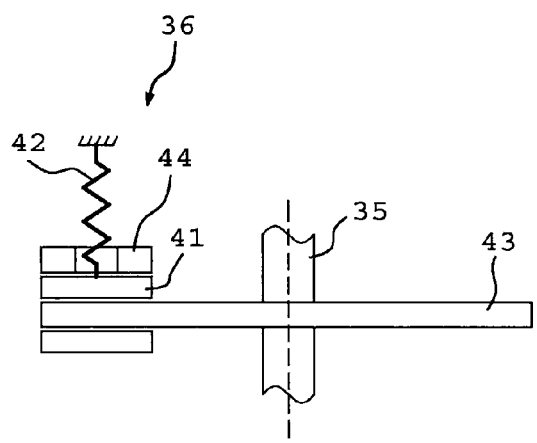
FIG. 5 shows a schematic view of a brake.

A schematic view of the brake 36 can be seen from FIG. 5, which comprises a friction element 41, which can be pressed by means of a spring 42 against a brake disc 43 non-rotatably connected to the motor shaft 35. Furthermore, an electric magnet 44 is provided, by means of which the friction element 41 at least partially consisting of magnetic material can be moved away from the brake disc 43. The force of the spring 42 is large enough for it to press the friction element 41 against the brake disc 43 when the electric magnet 44 is currentless so strongly that a rotation of the motor shaft 35 is prevented and the motor 20 is therefore blocked.

The invention claimed is:

1. A method for checking an electric energy storage device for a blade angle adjustment drive of a wind turbine, wherein the blade angle adjustment drive includes an electric motor having a motor shaft for adjusting an angle of a blade of the wind turbine, the method comprising:
   using a control unit to generate an electrical signal to controllably move a braking component into frictional contact with a brake disc operably associated with the motor shaft of the electric motor to provide a braking action on the motor shaft, and thereby preventing rotation of the blade of the wind turbine;
   loading an electric energy storage device using the electric motor with a converter, while rotation of the motor shaft of the electric motor is being physically prevented by frictional contact of the braking component with the motor shaft;
   observing a discharging of the electric energy storage device while rotation of the motor shaft is being physically prevented; and detecting a time course during which the discharging is taking place to produce time course data for an electrical signal relating to the discharging of the electric storage energy device, wherein the electrical signal relates to at least one of an intermediate circuit voltage associated with the converter or a current being drawn by the motor from an output stage of the converter, while the braking component is frictionally engaged with the motor shaft to simulate a load.

2. The method according to claim 1, further comprising observing the discharging of the electric energy storage device with the control unit, wherein the control unit is integrated in the converter, which said control unit activates the output stage of the converter to control a current of the electric motor.

3. The method according to claim 1, further comprising electrically connecting the electric energy storage device to the intermediate circuit of the converter during loading.

4. The method according to claim 3, further comprising electrically separating the intermediate circuit at a time before or at the loading of the electric energy storage device from a primary power supply and wherein the intermediate circuit is electrically separated during loading from the primary power supply.

5. The method according to claim 1, further comprising controlling a current of the electric motor during the loading of the electric energy storage device by the converter.

6. The method according to claim 1, further comprising determining a storable charging quantity of at least one of the electric energy storage device and a charging state of the electric energy storage device based on observing the discharging of the electric energy storage device.

7. The method according to claim 1, wherein the electric energy storage device comprises at least one accumulator.

8. The method according to claim 1, wherein the electric energy storage device comprises at least one capacitor.

9. The method according to claim 8, further comprising determining an electrical capacitance of the capacitor based on observing the discharging of the electric energy storage device.

10. The method according to claim 1, further comprising deactivating the braking component from contact with the motor shaft of the electric motor after the discharging of the electric energy storage device has been observed.

11. A blade angle adjustment drive for a wind turbine comprising:
   a converter having a direct voltage intermediate circuit adapted to be electrically fed by a primary power supply;
   an electric motor which is electrically coupled to the converter and adapted to be supplied with electric energy by the converter; and
   an electric energy storage device, by which the electric motor is supplied with electric energy using the intermediate circuit when the primary power supply fails;
   a braking component adapted to be moved into physical engagement with a motor shaft of the electric motor to provide a braking action on the motor shaft, to thus enable the electric motor to be used as a load component, while the motor shaft is physically braked by the braking component, during testing of the energy storage device;
   wherein the intermediate circuit is adapted to be electrically separated from the primary power supply without preventing further use of the converter with the electric energy storage device;
   when the primary power supply is separated from the intermediate circuit, the electric energy storage device is adapted to be electrically loaded by the converter and the electric motor as a result of the motor shaft being braked by the braking component;
   a discharging of the electric energy storage device, while being loaded by the electric motor as the motor shaft of the electric motor is being braked, is adapted to be observed; and
   a time course during which the discharging is occurring is determined to produce time course data for an electrical signal pertaining to the discharging of the electric energy storage device while the braking component is physically engaged with the motor shaft to simulate a load; and
   wherein the electrical signal comprises at least one of an intermediate circuit voltage associated with the converter or a current being output from an output stage of the converter.

12. The blade angle adjustment drive according to claim 11, further comprising a control unit for observing the discharging of the electric energy storage device, wherein the control unit is integrated in the converter and is operable to activate the output stage of the converter to control a motor current flowing through the electric motor while the motor shaft of the electric motor is being braked by the braking component.

13. The blade angle adjustment drive according to claim 11, wherein the electric energy storage device is adapted to be electrically connected to the intermediate circuit.

14. The blade angle adjustment drive according claim 11, further comprising:
   a control unit operable to actuate the braking component; and
   the primary power supply adapted to be electrically decoupled from the intermediate circuit while the discharging of the electric energy storage device is occurring as a result of the electric motor being loaded by engagement of the braking component with the motor shaft, to thus enable discharging of the electric energy storage device to be observed.

15. A blade angle adjustment drive for a wind turbine comprising:
   a control unit;
   a converter having a direct voltage intermediate circuit adapted to be electrically fed by a primary power supply;
   an electric motor which is electrically coupled to the converter and adapted to be supplied with electric energy by the converter;
   an electric energy storage device configured to be switched, in response to a signal from the control unit, to supply the electric motor with electric energy, using the intermediate circuit, when the primary power supply fails;
   a braking component, controlled by an additional signal from the control unit, to physically engage a motor shaft of the motor to apply a braking action to the motor shaft of the electric motor while discharging of the electric energy storage device is being observed, to thus enable the electric motor to be used as a load component during the discharging of the electric energy storage device;
   wherein the control unit further obtains time course data for an electrical signal pertaining to the electrical energy storage device during the discharging, and while the braking component is physically braking the motor shaft, to simulate a load; and wherein the electrical signal includes at least one of an intermediate circuit voltage associated with the converter or a current being output by an output stage of the converter.

16. The blade angle adjustment drive according to claim 15, wherein the intermediate circuit is adapted to be electrically separated from the primary power supply by the control unit when testing of the electric energy storage device is being performed.

* * * * *